US007055026B2

(12) United States Patent
Gere (10) Patent No.: US 7,055,026 B2
(45) Date of Patent: May 30, 2006

(54) METHOD AND SYSTEM FOR A PORTABLE ADAPTABLE OPERATING ENVIRONMENT IDENTITY

(75) Inventor: Gary Gere, Emerald Hills, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 698 days.

(21) Appl. No.: 10/206,736

(22) Filed: Jul. 26, 2002

(65) Prior Publication Data

US 2004/0019778 A1    Jan. 29, 2004

(51) Int. Cl.
    *G06F 15/177* (2006.01)
(52) U.S. Cl. .......................................... 713/100; 713/1
(58) Field of Classification Search .................... 713/1, 713/2, 100
    See application file for complete search history.

(56) References Cited

U.S. PATENT DOCUMENTS

| 5,325,532 | A | | 6/1994 | Crosswy et al. |
| 5,675,748 | A | * | 10/1997 | Ross ........................... 710/104 |
| 5,964,872 | A | | 10/1999 | Turpin |
| 6,633,977 | B1 | * | 10/2003 | Hamilton et al. ........... 713/100 |
| 6,636,961 | B1 | * | 10/2003 | Braun et al. .................... 713/1 |
| 6,728,877 | B1 | * | 4/2004 | Mackin et al. ............... 713/100 |
| 6,735,691 | B1 | * | 5/2004 | Capps et al. .................... 713/1 |

FOREIGN PATENT DOCUMENTS

| EP | 0 726 518 A2 | 8/1996 |
| EP | 1 033 647 A2 | 9/2000 |
| EP | 1 385 088 A3 | 1/2004 |

OTHER PUBLICATIONS

Bus Architecture Standards Committee of the IEEE Computer Society, "IEEE Standard for Boot (Initialization Configuration) Firmware: Core Requirements and Practices," 1994, IEEE Std 1275-1994, XP-002266235, pp. 229-231.
European Patent Office, European Search Report, dated Jan. 30, 2004, 4 pages.
IEEE Computer Society Bus Architecture Standards Committee, "IEEE Standard for Boot (Initialization Configuration) Firmware: Core Requirements and Practices", IEEE STD 1275-1994, http://ieeexplore.ieee.org/xpl/tocresult.jsp?isNumber=1654,pp. 230-231.

* cited by examiner

*Primary Examiner*—Dennis M. Butler
(74) *Attorney, Agent, or Firm*—Hickman Palermo Truong & Becker LLP; Christopher J. Brokaw (57) ABSTRACT

A method and system for implementing a transportable operating system boot environment on a computer system. The method includes the step of accessing a stored operating system environment coupled to the computer system. An identity object is then accessed, wherein the identity object includes hardware and software configuration information regarding the computer system. The hardware and software configuration information of the identity object is then impressed onto the stored operating system environment to update the stored operating system environment in accordance with the computer system. The computer system is then booted using the updated stored operating system environment. The stored operating system environment can be coupled to the computer system using a removable media. The identity object can be impressed onto the stored operating system environment by using an agent running on the computer system.

20 Claims, 5 Drawing Sheets

METHOD AND SYSTEM FOR A PORTABLE ADAPTABLE OPERATING ENVIRONMENT IDENTITY

FIELD OF THE INVENTION

The field of the present invention pertains to the transportability of data and software applications among multiple computer systems. More particularly, the present invention relates to a method and system for transferring operating characteristics and data between computer systems having different characteristics and capabilities.

BACKGROUND OF THE INVENTION

Computer systems are being used today to perform a wide variety of tasks. Many different areas of business, industry, government, education, entertainment, and most recently, the home, are tapping into the enormous and rapidly growing list of applications developed for today's increasingly powerful computer devices.

Software applications have also become a key technology for communicating ideas, data, and trends in most areas of commerce, science, and education. Many computer systems are configured to interact with users through graphical user interfaces (GUIs) that support real time user interaction, three dimensional (3D) interactive images, visual representations of real-world system status, and the like. A primary user interface with a typical computer system is generally implemented through the computer system's operating system.

A computer operating system, or operating environment, comprises a primary mechanism through which computers implement their functionality (e.g., GUI, access to user applications, etc.). An operating system typically refers to a "master control program" that runs the computer system. The operating system is typically the first program loaded when the computer is turned on. In general, the main portion of the operating system, the "kernel," resides in memory at all times. The operating system sets the standards for all application programs that run in the computer. The applications "talk to" the operating system for all user interface and file management operations. Also called an "executive" or "supervisor," a computer operating system insures the multitasking functionality, whereby multiple programs are executed within the computer system at the same time. The number of programs that can be effectively multitasked depends on the type of multitasking performed (preemptive vs. cooperative), CPU speed and memory and disk capacity.

Operating systems are generally configured for operation with the particular hardware platform provided by the computer system in which they are installed. The capability of the computer system largely determines the capability and functionality of the applications an operating system can support, and the overall capability and functionality of the operating environment.

Accordingly, different machines tend to have different operating environments. For example, one machine may be equipped with multiple hard disk drives, where as a similar, otherwise identical machine may be equipped with only a single removable hard disk drive.

A problem exist in those situations where it is desirable to implement portability with respect to the operating environment. Generally, it is not uncommon to have removable storage connected to a computer system to allow portability of data. For example, a user may configure a computer system to store his application data on a removable disk drive. When the user changes locations, the user can remove the disk drive and insert the disk drive at the new machine at the new location.

However, portability is not as easily attained with respect to the operating environment. A primary reason for this is the fact that the underlying hardware platform of two given computer systems can be very much different from one another. One machine, because of different hardware configurations, different network addresses, different peripheral devices, can be incompatible with a operating environment copied from another machine (e.g., via a removable disk drive).

One reason for the incompatibility with respect to operating environments is the different system environment of the machine's device drivers. A device driver typically refers to a program routine that links a peripheral device to the operating system. It is written by programmers who understand the detailed knowledge of the device's command language and characteristics. It contains the precise machine language necessary to perform the functions requested by the application. When a new hardware device is added to the computer, such as a display adapter, its driver must be accessed by the operating system in order to use it. The operating system calls the driver, and the driver "drives" the device. Routines that perform internal functions, such as memory managers and disk caches also require drivers. The unique combination of device drivers is usually accounted for when an operating system is first installed on the machine. Thus, subsequent, ported-over operating systems which may be accessed, for example, via a portable disk drive, would not be able to boot properly in the new machine.

Hardware differences are often not the only reason a portable operating system will have compatibility problems. There may be software based incompatibilities also. One such example is the fact that the newly arrived portable operating system would have no knowledge of the network configuration of the computer system. The new operating system would not know, for example, gateway addresses, IP addresses, domain names, workgroup names, and the like, required for functioning in the network environment.

One prior art solution to implement a degree of portability utilizes a cloning scheme, wherein a clone or an image of a particular instance of an operating system environment is transported onto a similar computer system using removable storage media. However the solution has a significant drawback in that the cloned operating system environment requires its configuration to be changed, or customized, to function in the new hardware environment of the new machine. This typically requires numerous changes to numerous system files, and even then, may not be successful.

Thus what is required is a solution that implements portability of an operating environment. What is required is a solution that allows an operating environment to be transferred to removable storage, transported to a new machine, and booted to the new machine in a seamless manner, taking into account any hardware or software particularities of the new machine. The present invention provides a novel solution to these requirements.

SUMMARY OF THE INVENTION

Embodiments of the present invention provide a method and system for implementing a portable adaptable operating environment identity. Embodiments of the present invention implement portability of an operating environment between multiple machines. Embodiments of the present invention allow an operating environment to be transferred to removable storage, transported to a new machine, and booted to the new machine in a seamless manner, taking into account any hardware or software particularities of the new machine.

In one embodiment, the present invention comprises a computer implemented method for transferring an operating system boot environment to a computer system. The method includes the step of accessing a stored operating system environment coupled to the computer system. An identity object is then accessed, wherein the identity object includes hardware and software configuration information regarding the computer system. The identity object can be previously generated and stored (e.g., as a file) or can be dynamically generated on-the-fly. The hardware and software configuration information of the identity object is then impressed onto the stored operating system environment to update the stored operating system environment in accordance with the computer system. The computer system is then booted using the updated stored operating system environment.

The stored operating system environment can be coupled to the computer system using a removable media (e.g., a CD ROM, removable hard drive, etc.) device, or can be accessed over a network (e.g., Ethernet, Bluetooth, etc.). The identity object can be impressed onto the stored operating system environment by using an agent running on the computer system. The hardware configuration information of the identity object includes information describing the hardware functionality of the computer system (e.g., disk arrays, SCSI buses, peripheral devices, installed memory, number of processors, etc.). The software configuration information of the identity object includes information describing the software functionality of the computer system (e.g., network identification, gateway addresses, domain names, application servers, and the like). Once the computer system is booted using the updated stored operating system environment, the new operating system environment has access to the full hardware and software functionality of the new machine, and is able to provide such functionality to the user while retaining its inherent "original" personality.

These and other advantages of the present invention will no doubt become evident to those of ordinary skill in the art after having read the following detailed description of the preferred embodiments which are illustrated in the various drawing figures.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention provide a method and system for implementing a portable adaptable operating environment identity. Embodiments of the present invention implement portability of an operating environment between multiple machines. Embodiments of the present invention allow an operating environment to be transferred to removable storage, transported to a new machine, and booted to the new machine in a seamless manner, taking into account any hardware or software particularities of the new machine.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating" or "accessing" or "communicating" or "executing" or "displaying" or the like, refer to the action and processes of a computer system (e.g., computer system 512 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Invention

Figure 1:
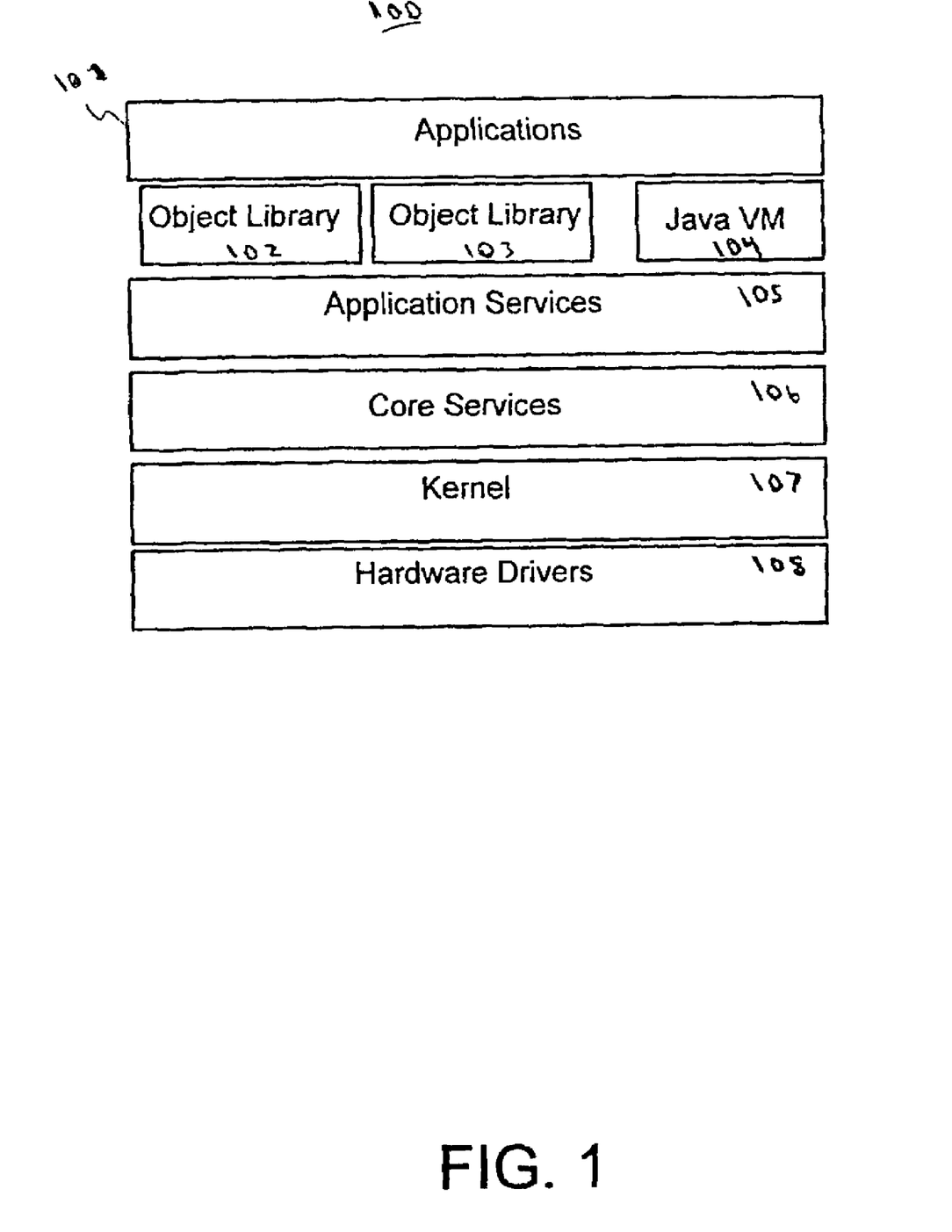
FIG. 1 shows a generalized overview diagram of an operating system environment in accordance with one embodiment of the present invention.

FIG. 1 shows a generalized overview diagram of an operating system environment 100 in accordance with one embodiment of the present invention. As depicted in FIG. 1, the operating system environment 100 includes an applications layer 101, object libraries 102 and 103, Java virtual machine 104, on top of an application services layer 105. The application services layer 105 resides on top of a core services layer 106. Each of these layers are serviced by a kernel 107. The kernel 107 interfaces with the hardware of the computer system via a hardware drivers layer 108.

Thus, FIG. 1 shows a common manner in which complex software architectures are visually depicted, wherein functionally distinct portions of a software architecture are separated out into "layers." As diagramed in FIG. 1, one layer sits on top of another, with the most fundamental layer on the bottom. The relationship between the layers of the diagram suggests the general interfaces and dependencies between the layers of software. For example, as depicted in system 100, the higher layers of software, which are the closest to actual application code, depend on the layer immediately under them, and that intermediate layer depends on an even lower layer.

It should be noted that system 100 as depicted in FIG. 1 is intended to depict a clarified view of the overall architecture of an operating system environment. Those skilled in the art will recognize simplifications inherent in the FIG. 1 depiction. The services and subsystems that one application uses, and how it uses them, can be very different from those used by another application, even one of a similar type. Dependencies and interfaces at the different levels can vary from program to program depending on individual requirements and realities. In one embodiment of the present invention, the operating system environment of computer system 100 is a Solaris™ operating system environment.

Figure 2:
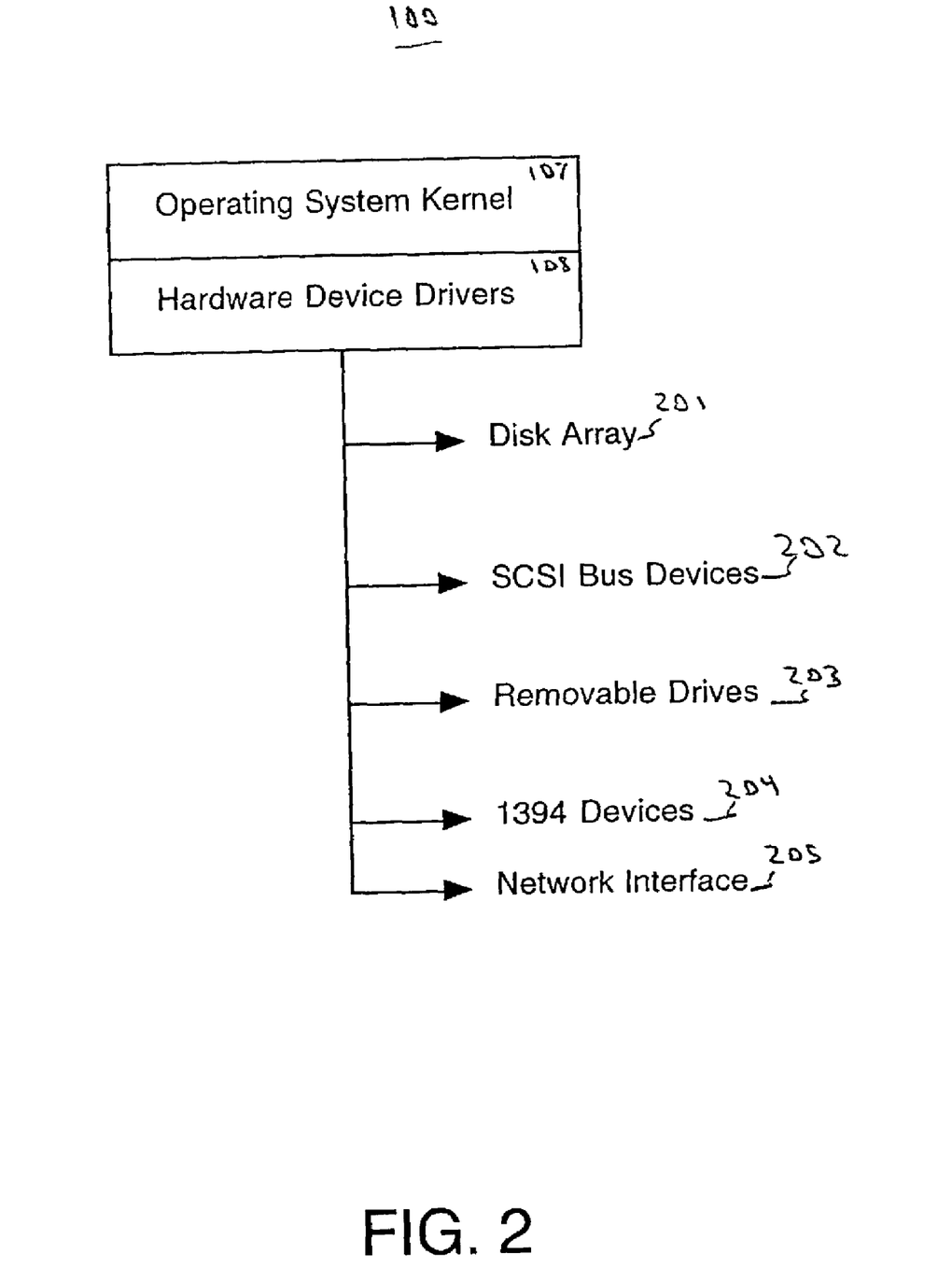
FIG. 2 shows the operating system kernel and the hardware device drivers of the computer system in conjunction with coupled hardware devices in accordance with one embodiment of present invention.

FIG. 2 shows the operating system kernel 106 and the hardware device drivers 108 of the computer system 100 in conjunction with coupled hardware devices 201–205. The hardware device drivers 108 provide the software necessary to interface with the particular pieces of hardware that provide the storage functions, communications functions, interfacing functions, and the like, to the computer system 100.

As known by those skilled in the art, typical operating system environments are customized and configured for the particular circumstances of the machine on which they are installed. Accordingly, a primary concern in ensuring compatibility between different operating environments is ensuring such customizations and configurations are consistent between the environments, particularly, with respect to the machine's device drivers (e.g., device drivers 108). A hardware driver typically refers to a program routine that links a peripheral device (e.g., devices 201–205) to the operating system kernel 107. The device drivers 108 contain the precise machine language necessary to perform the functions requested by the application (e.g., applications 101 shown in FIG. 1). To access functionality of the particular device, for example, the disk array 201, its driver must be accessed by the operating system kernel 107. The operating system calls the driver, and the driver implements the software based commands required to operate the device.

In accordance with embodiments of the present invention, new or "foreign" operating system environments can be transferred to the computer system 100 and function in a manner fully compatible with the existing hardware and software configuration of the computer system 100. Typically, the unique combination of device drivers is usually accounted for when an operating system is first installed on the machine. Thus, subsequent, ported-over operating systems which may be accessed, for example, via the removable disk drive 203 or over a network via the network interface 321, would not be able to boot properly in the new machine 100. However, embodiments of the present invention implement a portable adaptable operating environment identity that allows a new operating system environment to adapt to, and take advantage of, the hardware capabilities of the new machine 100.

In addition to utilizing the hardware capabilities of the machine 100, embodiments of the present invention also transfer configuration information to the new operating system environment to allow the new operating system environment to take advantage of the software based functions of the new machine 100. Such software based functions include, for example, network functionality (e.g., access to Internet gateways, network domains, server based services, and the like) application functionality (e.g., access to newer or more powerful software applications installed on the machine 100, updated device drivers, and the like) and other types of non-hardware functions which serve to make the computer system 100 a unique machine.

Figure 3:
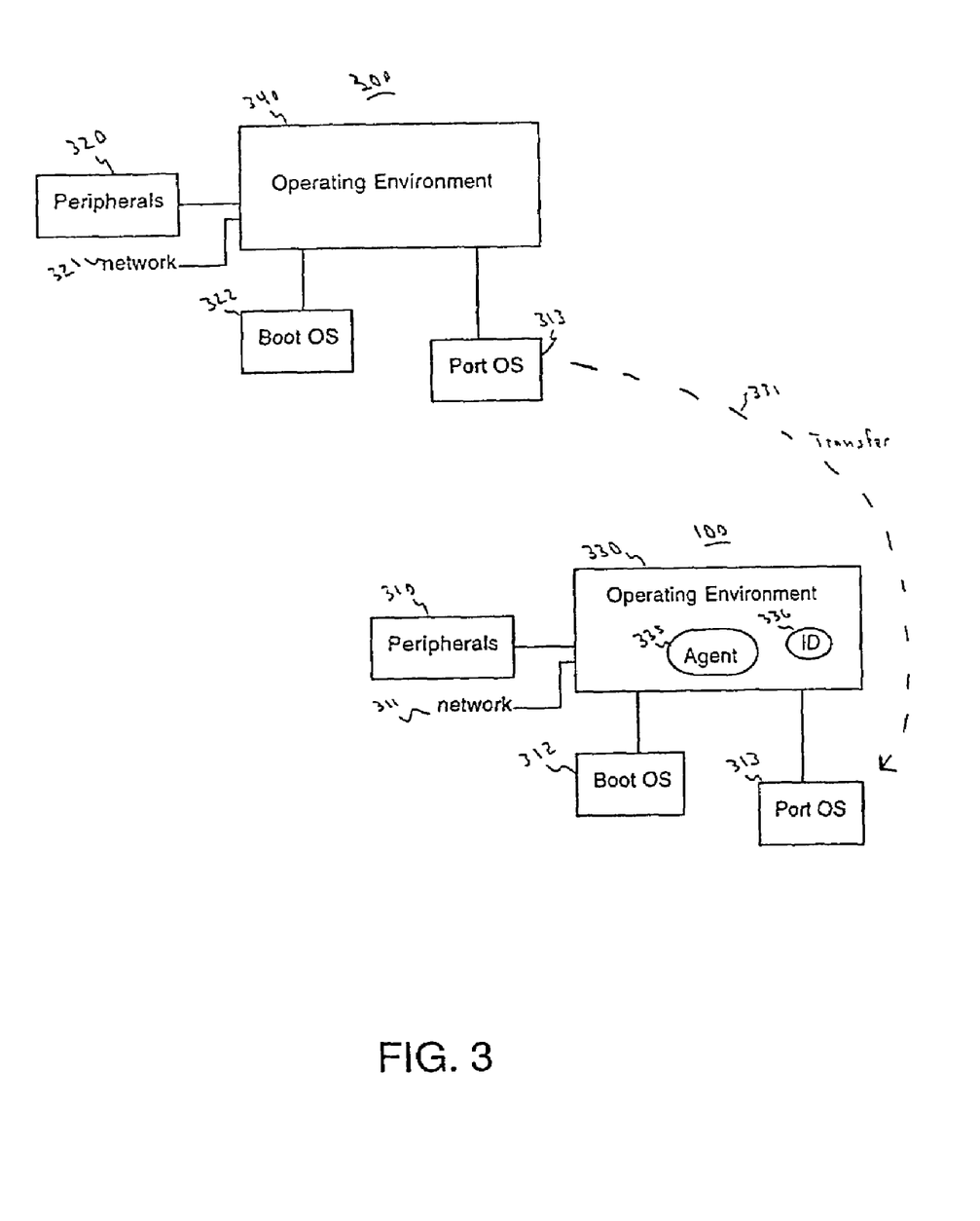
FIG. 3 shows a diagram depicting an operating system environment transfer process in accordance with one embodiment of the present invention.

FIG. 3 shows a diagram depicting an operating system environment transfer process in accordance with one embodiment of the present invention. As depicted in FIG. 3, a portable operating system environment 340 is transferred from a first computer system 300 to the second computer system 100.

FIG. 3 diagrams a process whereby a bootable operating system environment of a first machine (e.g., computer system 300) is ejected from the first machine and transferred to a second machine (e.g., computer system 100). Embodiments of the present invention provide the software support that allows the new operating system environment 340 to boot properly on the new machine, computer system 100.

In the present embodiment, the operating system environment 340 creates a stored instance of a portable operating system environment 313 on a storage media. The portable operating system environment 313 comprises a bootable operating system. The computer system 300 is shown with two bootable operating systems 322 and 313. The computer system 300 is capable of booting with either the operating system environment 322 or the operating system environment 313. This allows a user to eject the operating system 313, by, for example, removing a portable disk drive storing the operating system 313, and transfer that operating system environment to a new machine, in this case, the computer system 100, as shown by the dotted transfer line 331, while still retaining a bootable instance of an operating system environment (e.g., operating system 322).

The stored in operating system environment 313 is subsequently coupled to the computer system 100 (e.g., by plugging in the removable disk drive). Once the operating system environment 330 gains access to the stored operating system 313, an identity object 336 is accessed, wherein the identity object 336 includes hardware and software configuration information regarding the computer system 100. The hardware and software configuration information of the identity object 336 is then impressed onto the stored operating system environment 313 to update the stored operating system environment 313 in accordance with the characteristics of the computer system 100. The identity object can be impressed onto the stored operating system environment by using an agent 335 running on the computer system 100. The computer system is then booted using the updated stored operating system environment 313, by, for example, executing a restart procedure.

In the present embodiment, the hardware configuration information of the identity object 336 includes information describing the hardware functionality of the computer system 100 (e.g., disk arrays, SCSI buses, peripheral devices 310, installed memory, number of processors, etc.). The software configuration information of the identity object 336 includes information describing the software functionality of the computer system (e.g., network configuration information 311, gateway addresses, domain names, application servers, and the like). Once the computer system is booted using the updated stored operating system environment 313, the updated operating system environment 313 has access to the full hardware and software functionality of the new machine 100, and is able to provide such functionality to the user while retaining its inherent "original" personality. The original personality can be, for example, address book information for user, graphical user interface desktop information, and other characteristics which give the portable operating system environment 313 its own unique look-and-feel.

Referring still to FIG. 3, when the computer system 100 boots with the new operating system environment 313 from the computer system 300, it will have a look and feel in accordance with the new operating system 313, but will also retain certain personality characteristics, or identity characteristics, of the computer system 100. For example, the computer system 100 will retain access to its peripherals 310, its network identity and configuration, and the power of its internal computer system components (e.g., number of processors and amount of installed memory, etc.). Similarly, the new operating system 313 will retain its look and feel, but will be updated with the identity object 336 information to allow it to properly boot in the new hardware environment of the computer system 100. The new operating system 313 will retain its look and feel but still have access to the hardware and software functions provided by the computer system 100. For example, the new operating system 313, once booted onto computer system 100, will no longer have access to the peripherals 320 or the network 321 coupled to the computer system 300. It will, however, have access to the peripherals 310 and the network 311 coupled to the computer system 100. Because of the customization and impression process performed by the agent 335, the new operating system 313 will accomplish this transfer seamlessly with respect to the viewpoint of the user.

Once execution in the computer system 100 is complete, the operating system environment 313 can be ejected from the computer system 100 and, for example, returned to the computer system 300. The computer system 100 can then reboot with the operating system 312, and assume its original personality. In this manner, embodiments of the present invention implement portability of an operating environment between multiple machines. Embodiments of the present invention allow an operating environment to be transferred to removable storage, transported to a new machine, and booted to the new machine in a seamless manner, taking into account any hardware or software particularities of the new machine.

It should be noted that although the FIG. 3 embodiment shows the portable operating system environment 313 being accessed by the second computer system 300 via the removable media, the portable operating system environment 313 could also be accessed using other means besides removable media, such as, for example, being accessed through the network interface 311.

Figure 4:
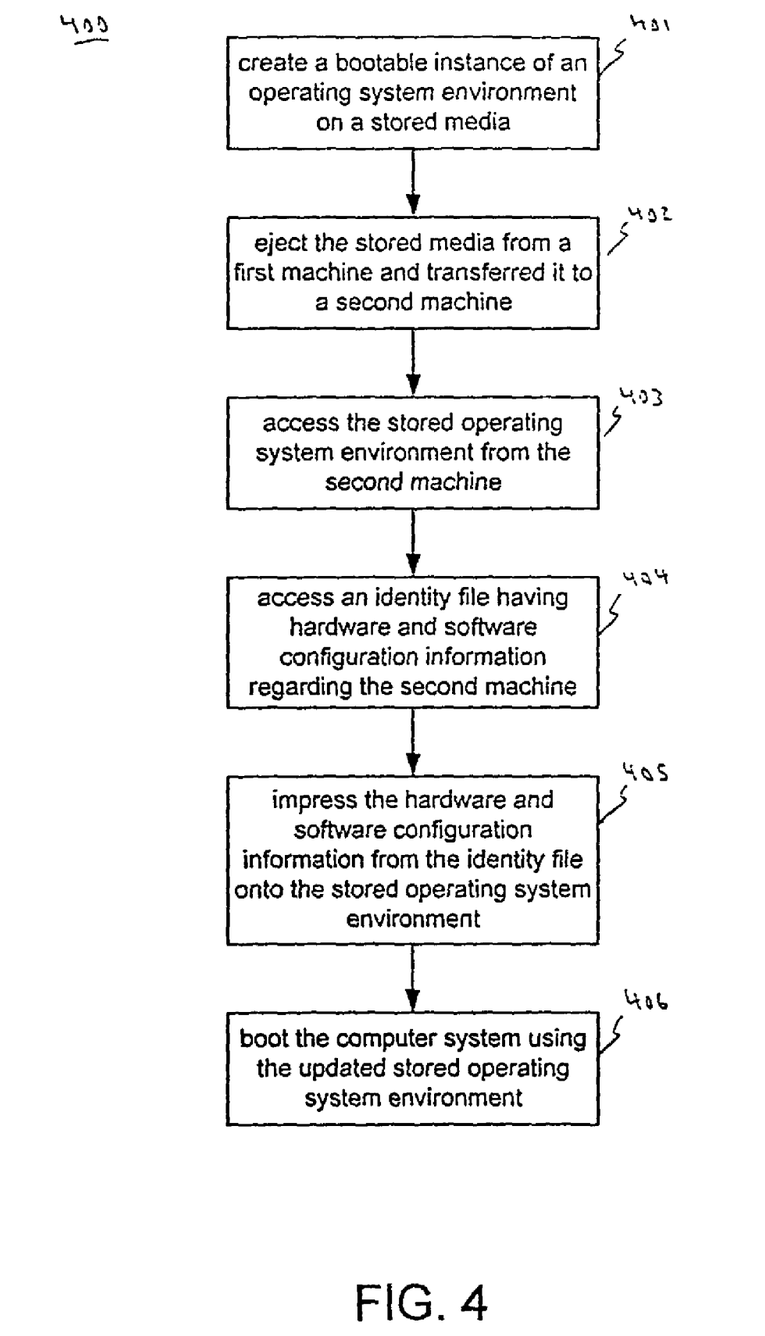
FIG. 4 shows a flowchart of the steps of an operating system environment transfer process in accordance with one embodiment of the present invention.

Referring now to FIG. 4, a flowchart of an operating system environment transfer process 400 in accordance with one embodiment of the present invention is shown. FIG. 4 depicts the operating steps involved in transferring and operating system environment from a first machine (e.g., computer system 300 of FIG. 3) to a second machine (e.g., computer system 100).

Process 400 begins in step 401, where a bootable instance of an operating system environment is stored on a storage media (e.g., removable disk drive, CD ROM, etc.). In step 402, the storage media containing the portable operating system environment (e.g., portable operating system environment 313) is ejected from a first machine (e.g., computer system 300) and transferred to a second machine (e.g., computer system 100) by connecting the storage media. In step 403, the stored operating system environment on the storage media is then accessed from the currently running operating system environment of the second machine. In step 404, an identity object having hardware and software configuration information for the second machine is then accessed.

Referring still to process 400 of FIG. 4, in step 405, the hardware and software configuration information from the identity object is impressed onto the stored operating system environment on the storage media. As described above, the impression, or customization, can be performed by an agent running on the second computer system. Subsequently, in step 406, once the impression is complete, the second computer system is booted using the updated stored operating system environment on the storage media. Hence, once booted, the second computer system will a personality and look and feel in accordance with the stored offering system environment, but will still retain certain capabilities and personalities of the second computer system. Additionally, the impression and boot process will occur in a manner transparent to the user.

Computer System Platform

Figure 5:
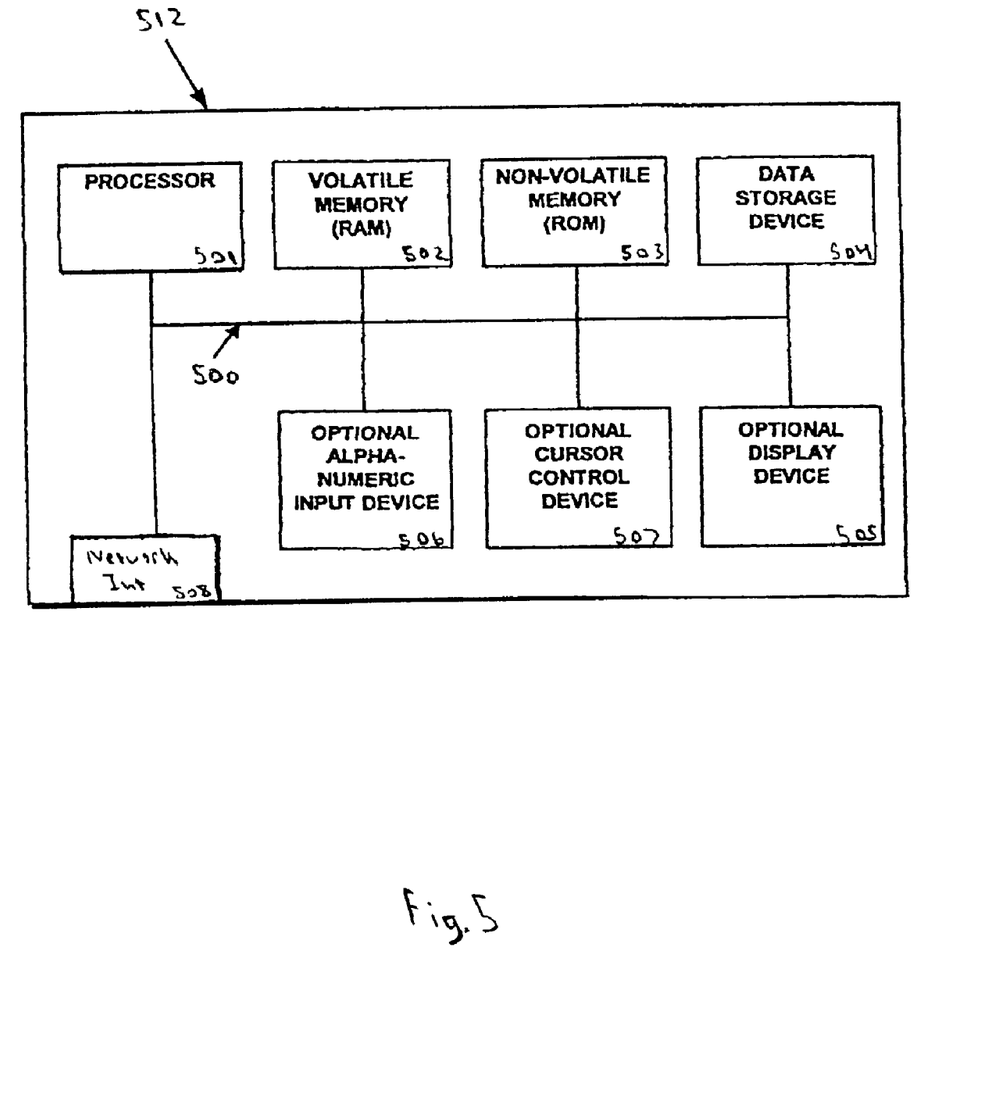
FIG. 5 shows the components of a computer system platform in accordance with one embodiment of the present invention.

With reference now to FIG. 5, a computer system 512 in accordance with one embodiment of the present invention is shown. Computer system 512 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 512) and are executed by the processor(s) of system 512. When executed, the instructions cause the computer system 512 to implement the functionality of the present invention as described above.

In general, computer system 512 comprises an address/data bus 500 for communicating information, one or more central processors 501 coupled with the bus 500 for processing information and instructions, a computer readable volatile memory unit 502 (e.g., random access memory, static RAM, dynamic, RAM, etc.) coupled with the bus 500 for storing information and instructions for the central processor(s) 501, a computer readable non-volatile memory unit 503 (e.g., read only memory, programmable ROM, flash memory, EPROM, EEPROM, etc.) coupled with the bus 500 for storing static information and instructions for the processor(s) 501. System 512 also includes a mass storage computer readable data storage device 504 such as a magnetic or optical disk and disk drive coupled with the bus 500 for storing information and instructions. Optionally, system 512 can include a display device 505 coupled to the bus 500 for displaying information to the computer user, an alphanumeric input device 506 including alphanumeric and function keys coupled to the bus 500 for communicating information and command selections to the central processor(s) 501, a cursor control device 507 coupled to the bus for communicating user input information and command selections to the central processor(s) 501, and a network interface device 508 coupled to the bus 500 for communicating with other computer systems on a coupled network.

Thus, embodiments of the present invention provide a method and system for implementing a portable adaptable operating environment identity. Embodiments of the present invention implement portability of an operating environment between multiple machines. Embodiments of the present invention allow an operating environment to be transferred to removable storage, transported to a new machine, and booted to the new machine in a seamless manner, taking into account any hardware or software particularities of the new machine.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method implemented by a computer system, comprising:
   accessing an identity object having configuration information of the computer system;
   accessing a stored operating system environment, wherein the computer system has an existing operating system environment, and wherein the stored operating system environment is a different operating system environment than the existing operating system environment;
   impressing the configuration information of the identity object onto the stored operating system environment to update the stored operating system environment to reflect the configuration information of the computer system; and
   booting the computer system using the updated stored operating system environment instead of the existing operating system environment.

2. The method of claim 1 further comprising:
   impressing the identity object onto the stored operating system environment by using an agent running on the computer system.

3. The method of claim 1 wherein the configuration information of the identity object describes hardware functionality of the computer system.

4. The method of claim 1 wherein the configuration information of the identity object describes network functionality of the computer system.

5. A method for transferring a boot environment from a first computer system to a second computer systems comprising:
   generating a stored operating system environment using a first computer system;
   accessing the stored operating system environment using a second computer system, wherein the second computer system has an existing operating system environment, and wherein the stored operating system environment is a different operating system environment than the existing operating system environment;
   accessing an identity object having configuration information of the second computer system;
   updating the stored operating system environment in accordance with the configuration information of the identity object, wherein the updated stored operating system reflects the configuration information of the second computer system; and
   booting the second computer system using the updated stored operating system environment instead of the existing operating system environment.

6. The method of claim 5 wherein the configuration information includes hardware configuration information and software configuration information for the second computer system.

7. The method of claim 6 wherein the hardware and software configuration information of the identity object describes hardware functionality of the computer system.

8. The method of claim 6 wherein the hardware and software configuration information of the identity object describes network functionality of the computer system.

9. The method of claim 5 further comprising:
   updating the stored operating system environment by using an agent running on the second computer system.

10. The method of claim 5 wherein the identity object is stored on the second computer system.

11. A system for implementing a transportable operating system boot environment comprising:
    a computer system having a processor coupled to a memory, the memory having computer readable code which when executed by the processor causes the computer system to implement a method comprising:
    accessing an identity object having hardware and software configuration information of the computer system;
    accessing a stored operating system environment, wherein the computer system has an existing operating system environment, and wherein the stored operating system environment is a different operating system environment than the existing operating system environment;
    impressing the hardware and software configuration information of the identity object onto the stored operating system environment to update the stored operating system environment to reflect the configuration information of the computer system; and
    booting the computer system using the updated stored operating system environment instead of the existing operating system environment.

12. The system of claim 11 further comprising:
    impressing the identity object onto the stored operating system environment by using an agent running on the computer system.

13. The system of claim 11 wherein the hardware and software configuration information of the identity object describes hardware functionality of the computer system.

14. The system of claim 11 wherein the hardware and software configuration information of the identity object describes network functionality of the computer system.

15. A computer readable media having computer readable code which when executed by a computer system cause the computer system to implement a method for implementing a transportable operating system boot environment comprising:

accessing an identity object having configuration information of the computer system;

accessing a stored operating system environment, wherein the computer system has an existing operating system environment, and wherein the stored operating system environment is a different operating system environment than the existing operating system environment;

impressing the configuration information of the identity object onto the stored operating system environment to update the stored operating system environment to reflect the configuration information of the computer system; and     booting the computer system using the updated stored operating system environment instead of the existing operating system environment.

16. The computer readable media of claim 15 further comprising: impressing the identity object onto the stored operating system environment by using an agent running on the computer system.

17. The computer readable media of claim 15 wherein the configuration information of the identity object describes hardware functionality of the computer system.

18. The computer readable media of claim 15 wherein the configuration information of the identity object describes network functionality of the computer system.

19. A computer system for implementing a transportable operating system boot environment comprising:

means for accessing a stored operating system environment, wherein the computer system has an existing operating system environment, and wherein the stored operating system environment is a different operating system environment than the existing operating system environment;

means for accessing an identity object having hardware and software configuration information of the computer system;

means for impressing the hardware and software configuration information of the identity object onto the stored operating system environment to update the stored operating system environment to reflect the configuration information of the computer system; and     means for booting the computer system using the updated stored operating system environment instead of the existing operating system environment.

20. The system of claim 19 wherein the means for impressing the identity object onto the stored operating system environment includes an agent configured to access the identity object and access the stored operating system environment.

* * * * *

UNITED STATES PATENT AND TRADEMARK OFFICE
CERTIFICATE OF CORRECTION

| | | |
|---|---|---|
| PATENT NO. | : 7,055,026 B2 | Page 1 of 1 |
| APPLICATION NO. | : 10/206736 | |
| DATED | : May 30, 2006 | |
| INVENTOR(S) | : Gary Gere | |

It is certified that error appears in the above-identified patent and that said Letters Patent is hereby corrected as shown below:

Column 9
Claim 5: Line 66, delete "systems" and insert --system,--.

Signed and Sealed this

Twenty-second Day of August, 2006

JON W. DUDAS
*Director of the United States Patent and Trademark Office*